United States Patent Office 3,508,872
Patented Apr. 28, 1970

3,508,872
PRODUCTION OF GRAPHITE FIBRILS
Dagobert E. Stuetz, Westfield, and Charles L. Smart, Millington, N.J., assignors to Celanese Corporation, New York, N.Y., a corporation of Delaware
No Drawing. Filed Sept. 1, 1967, Ser. No. 664,930
Int. Cl. C01b 31/04
U.S. Cl. 23—209.1                                                                3 Claims

ABSTRACT OF THE DISCLOSURE

A naturally occurring cellulosic material such as particulate wood is converted to graphite fibrils by thermal treatment. The graphite fibrils formed according to the invention possess highly desirable physical properties, and are particularly suited for use as a fire resistant smokeless reinforcing medium for incorporation in a binder to form a composite article.

BACKGROUND OF INVENTION

The invention relates to the graphitization of naturally occurring cellulosic materials. More particularly, in a preferred embodiment of the invention a process is provided in which wood fragments are efficiently converted to graphite fibrils having a discontinuous nature.

As is well known, graphite occurs in nature as one of the two naturally occurring forms of crystalline carbon, and is usually found as a soft black mass or as flakes disseminated in metamorphitized rock. Additionally, synthetic graphite may be manufactured from some forms of amorphous carbon, such as lampblack or petroleum coke, in an electric furnace with or without the presence of a tar or pitch. The physical configuration of a graphite article produced thereby has commonly been that of a block product. In recent years elaborate and generally time consuming procedures for the formation of fibrous graphite have been proposed in which continuous cellulosic filaments or woven textile articles formed therefrom serve as the starting material. See, for example, U.S. Patents Nos. 3,107,152 to Ford et al., 3,116,975 to Cross et al., and 3,179,605 to Ohsol. Certain synthetic polymeric filaments, such as those formed from acrylonitrile homopolymers or copolymers may likewise serve as a starting material in processes proposed for the production of fibrous graphite. See, for example, U.S. Patent No. 3,285,696 to Tsunoda. Processes for the production of fibrous graphite from continuous textile starting materials have generally required maintenance of an inert or non-oxidizing atmosphere throughout at least a portion of the various graphitization processes utilized. While the simple carbonization of wood fibers to produce an absorbent medium has been suggested in the past, such as disclosed in U.S. Patent No. 3,011,981 to Soltes, graphitized wood fibers have heretofore not been available.

It is an object of the invention to provide an efficient process for the production of a fire resistant smokeless reinforcing medium in the form of graphite fibrils, i.e. short fibers, which utilizes an inexpensive and readily available starting material.

It is an object of the invention to provide a process for the production of graphite fibrils from wood fragments.

It is an object of the invention to provide fire resistant smokeless graphite fibrils.

It is another object of the invention to provide a composite article comprising a reinforcing core of fire resistant smokeless graphite fibrils.

It is a further object of the invention to provide a process whereby particulate naturally occurring cellulosic materials may be efficiently graphitized without the necessity of carrying out at least a portion of the process in an inert or non-oxidizing atmosphere.

These and other objects, as well as the scope, nature, and utilization of the invention will be apparent from the following detailed description and appended claims.

SUMMARY OF INVENTION

It has now been discovered that a process for the production of graphite fibrils comprises heating a particulate naturally occurring cellulosic material having maximum linear dimensions up to about one-half inch possessing a fibrillar structure and containing volatile components in an oxygen containing atmosphere at about 150 to 400° C. until the volatile components present in said material are substantially removed to produce a charred product which retains a fibrillar structure, and subsequently subjecting said charred product to a temperature of about 2000 to 3000° C. until graphitization is substantially complete to produce graphite fibrils.

A composite article comprising a binder having graphite fibrils of the present invention incorporated therein may be formed.

DESCRIPTION OF PREFERRED EMBODIMENTS

The particulate naturally occurring cellulosic materials utilized in the present process may be wood fragments derived from either softwoods or hardwoods. Illustrative examples of softwoods which may be utilized include hemlock, balsam, pine, spruce, etc. Illustrative examples of hardwoods which may be utilized include cottonwood, aspen, birch, maple, etc. Wood inherently possesses a natural fibrillar structure which may be readily perceived by the examination of samples thereof through a conventional optical microscope. Prior to treatment according to the present invention the wood will commonly contain cellulose, hemicellulose and lignin as its major solid constituents. If desired, lignin may be removed by conventional pulping procedures, such as commonly utilized in cellulose production, prior to carrying out the present process. However, the preliminary removal of lignin is not essential, and does not appreciably alter the properties of the graphitized wood fibers ultimately obtained. Other naturally occurring cellulose precursors possessing a fibrillar structure, such as cotton linters and the like, may likewise be utilized in the process.

The particulate naturally occurring cellulosic materials utilized in the process possess a maximum linear dimension up to about one-half inch. Fragmentation or particulation of wood raw material to the desired dimensions may be conducted by any one of a variety of procedures. For instance, it is possible to grind, to mill, or to chip the wood to the desired physical configuration by conventional procedures which will be readily apparent to those skilled in wood technology. Thermomechanical pulp is the preferred wood raw material. Inexpensive coarse sawdust may likewise be employed in the process. The maximum linear dimension for suitable wood fragments ranges from about 0.01 inch up to about one-half inch. In a particularly preferred embodiment of the invention the maximum linear dimension for the wood fragments selected is about ⅜ inch.

During the initial step of the instant process the particulate naturally occurring cellulosic material undergoes a preoxidation treatment in an oxygen containing atmosphere, and is stabilized so that the subsequent graphitization step of the process may be endured without the concomitant destruction of the inherent fibrillar structure of the same. The preoxidation step may be conducted by heating the material in an oxygen containing atmosphere, such as ordinary air, at a temperature ranging from about 150 to about 400° C. While the heating is conducted, the volatile components present therein are substantially evolved, and a charred product results. Volatile components commonly expelled during the preoxidation step of the process include water vapor, oxygen, and carbon monoxide and carbon dioxide resulting from a partial combustion of the organic constituents of the material. Typically a 20 to 40 percent reduction in the weight of the material takes place during the preoxidation step of the instant process. It is believed that a cross-linking of carbon atoms occurs during the initial step of the process to produce a charred product which is substantially completely resistant to further volatilization and further combustion. For instance, the charred product is non-flammable when subjected to a match flame. The time required to complete the initial step of the instant process varies with the preoxidation temperature employed. For instance, if a temperature as low as about 150° C. is utilized, then heat treatment in an oxygen containing atmosphere of up to about 24 hours may be desirable. Preoxidation temperatures much below 150° C. are not recommended because of the difficulty of obtaining satisfactory stabilization within a reasonable period of time. At an elevated temperature of about 400° C. preoxidation may be satisfactorily conducted within about 10 minutes. Preoxidation temperatures much above 400° C. are not recommended because the rate of oxidation becomes faster than the rate of cross-linking, leading to excessive losses of material. In a particularly preferred embodiment of the invention the preoxidation portion of the process is conducted at about 300° C. for a period of about 30 minutes. The particulate material may be satisfactorily contained in any suitable receptacle, which will withstand the temperatures employed during the initial step of the process. For instance, the wood fragments may be placed on a stainless steel boat or tray and exposed to the preoxidation treatment in a conventional tube furnace in which the required elevated temperature is produced by radiation from electrically heated walls. The preoxidation reaction can be carried out also in an autoclave by heating to the required temperature/time schedule. A continuous preoxidation treatment may be accomplished by the passage of the particulate material through a heated vortex chamber or an inclined revolving tube or calcining furnace. The naturally occurring fibrillar structure originally present in the naturally occurring cellulosic material is retained throughout the preoxidation step of the process and may be observed by examining the charred product under a conventional optical microscope.

In the final step of the instant process the charred product is heated at a temperature of about 2000 to 3000° C. until graphitization is substantially complete, and any remaining elements present in the charred product other than carbon, e.g. hydrogen and oxygen, are substantially completely expelled. Weight losses of approximately 10 to 20 based on the weight of the original starting material are commonly encountered during the graphitization step. During such heating the charred product assumes a white-hot state which ultimately yields a grayish-black graphitized product. Some minor oxidation to water and carbon monoxide may take place during the final step of the process, however, the temperatures employed taken in conjunction with the cross-linked character of the charred material undergoing treatment strongly favors a pyrolysis reaction capable of producing a graphitized product. Upon examination under a conventional optical microscope the fibrillar configuration of the initial cellulosic fibers is apparent, and when subjected to X-ray diffraction the graphitic nature of the fibrils is confirmed. While the graphitization step of the instant process may be conducted in an inert atmosphere, entirely satisfactory results are obtained where no provision is made for the exclusion of oxygen. In fact, in a preferred embodiment of the invention the graphitization is attained by contacting the charred product with the flame of a conventional oxyacetylene torch, such as is commonly used for welding purposes. Suitable graphitization temperatures may likewise be produced by use of an induction furnace, arc furnace, solar furnace, low temperature plasma flame, etc. Such elevated graphitization heating may generally be completed within about 2 seconds to about 2 minutes. In a particularly preferred embodiment of the invention the charred product is maintained at a temperature of about 2400° C. for at least about 30 seconds. If heating periods much below 2 seconds are utilized, then substantially complete conversion to graphite fibrils is commonly not achieved. Temperatures much in excess of about 3000° C. are not recommended primarily because of the well-known material handling difficulties encountered at such extreme temperatures coupled with the possibility of subliming the graphite fibrils. Suitable containers or supports for the charred wood product during the graphitization step of the process include graphite trays, or graphite tubes.

Alternatively, graphitization may be conducted on a continuous basis by the passage of the preoxidized charred product through an oxyacetylene flame contained in a vortex chamber. By adjusting the residence time of the preoxidized material in the chamber the desired graphite fibrils may be efficiently produced. In such instances, the retaining walls of the chamber may be formed from more conventional materials, e.g. steel, and cooled by either convection from the surrounding air or by contact with a heat exchange medium, such as water, which may pass through the interior of the wall.

During the graphitization step of the instant process the fibrillar structure of the cellulosic material is maintained; however, the length of individual fibers originally present in the particulate starting material may be diminished by cleavage which may occur during the thermal treatment described heretofore. When softwoods fragments are utilized as the starting material graphite fibrils having a length of about 0.1 to 0.3 inch are commonly obtained. When the hardwood fragments are utilized as the starting material, graphite fibrils of generally shorter lengths commonly result, i.e. about 0.02 inch in length.

Graphitization of a particulate naturally occurring cellulosic material as described in detail herein has been found to impart improved physical properties to the same, and to convert the flammable starting material to high strength flexible smokeless fire resistant graphite fibrils. When incorporated in a binder, the graphite fibrils of the present invention may serve as a highly effective reinforcing medium. The binder selected for use with the graphite fibrils is preferably also resistant to elevated temperatures and of limited flammability. Organic or inorganic binders may be utilized to bond the graphite fibrils and form a solid composite article. Illustrative examples of suitable binders include: plaster of paris, concrete, etc.; silicone resins, epoxy resins, polybenzimidazole resins, etc.; metals such as aluminum, silver, steel, tungsten, etc.; ceramics from e.g. silica, alumina, zirconia, etc. Graphite fibrils obtained from softwoods, because of their generally longer lengths, are preferably used as reinforcing materials in plastics, while the generally shorter graphite fibrils obtained from hardwoods are particularly suited for incorporation in metals. If desired, conventional pigments, coloring agents, etc. may be present in the binder together with the graphitized wood fibers to achieve the desired decorative or appearance qualities. In a preferred embodiment of the invention, the binder may comprise about 20 to 80 percent by weight of the composite article. The composite articles find particular utility as high strength building panels and may be used interchangeably with conventional drywall or wall boards. Other uses for composite articles formed according to the invention include: pipes, floor tiles, reinforcing coatings, reinforced moldings, sealants, containers, etc.

The following example is given as a specific illustration of the invention. It should be understood, however, that the invention is not limited to the specific details set forth in the example.

Example

Wood of the pine tree was converted to conventional thermomechanical pulp by grinding the wood against a stone surface in the presence of steam. The maximum linear dimension for the resulting pulp fragments ranged from about ⅛ inch to ½ inch. 100 parts by weight of the wood fragments, which possessed a natural fibrillar structure, were placed in a stainless steel boat and introduced into a tube furnace. The wood pulp was heated at a temperature of 305° C. in the presence of air, and maintained at that temperature for 30 minutes. 60 parts by weight of a charred product were recovered which were found to retain a fibrillar configuration when examined under an optical microscope. The charred product was next transferred to a graphite tray, and heated from the top in the presence of air by use of an oxyacetylene flame produced by a welding torch to a white-hot state at a temperature of approximately 2400° C. for a period of 30 seconds. 40 parts by weight of a shiny, grayish-black product were collected. Under an optical microscope the product was found to have retained the fibrillar configuration of the original wood pulp. Upon examination by X-ray diffraction a pattern characteristic of essentially pure graphite was obtained.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. A process for the production of graphite fibrils comprising heating woody fibrous material having maximum linear dimensions of up to about one-half inch possessing a fibrillar structure and containing volatile components in an oxygen containing atmosphere at about 150 to 400° C. until the volatile components present in said material are substantially removed to produce a charred product which retains a fibrillar structure, and subsequently subjecting said charred product to a temperature of about 2000 to 3000° C. until graphitization is substantially complete to produce graphite fibrils.

2. A process according to claim 1 wherein said charred product is subjected to an oxyacetylene flame at a temperature of about 2000 to 3000° C. until graphitization is substantially complete.

3. A process for the production of graphite fibrils comprising heating wood fragments having a maximum linear dimension of about ⅜ inch possessing a fibrillar structure and containing volatile components in an oxygen containing atmosphere at about 300° C. for about 30 minutes to produce a charred product which retains a fibrillar structure, and subsequently subjecting said charred product to an oxyacetylene flame at a temperature of about 2400° C. for at least about 30 seconds to produce graphite fibrils.

References Cited

UNITED STATES PATENTS

| | | | |
|---|---|---|---|
| 2,796,331 | 6/1957 | Kauffman et al. | 23—209.4 |
| 2,822,321 | 2/1958 | Pickard | 23—209.2 |
| 3,011,981 | 12/1961 | Soltes | 23—209.1 X |
| 3,107,152 | 10/1963 | Ford et al. | 23—209.2 |
| 3,208,013 | 9/1965 | Walker et al. | 23—209.2 X |
| 3,235,323 | 2/1966 | Peters | 8—116.2 |
| 3,378,345 | 4/1968 | Bourdeau et al. | 23—209.1 |
| 3,406,126 | 10/1968 | Litant | 23—209.2 X |
| 3,412,062 | 11/1968 | Johnson et al. | 260—37 |

OTHER REFERENCES

Schimidt et al., "Chemical Engineering Progress," vol. 58, No. 10, October 1962, pp. 42–50.

EDWARD J. MEROS, Primary Examiner

U.S. Cl. X.R.

23—209.2